United States Patent
Narayanan et al.

(10) Patent No.: US 9,568,988 B1
(45) Date of Patent: *Feb. 14, 2017

(54) EFFICIENT POWER ALLOCATION FOR REDUNDANT POWER SUPPLY WITH SYSTEM PRIORITY

(71) Applicant: Juniper Networks, Inc., Sunnyvale, CA (US)

(72) Inventors: Kumaran Narayanan, San Ramon, CA (US); Euan Mowat, San Francisco, CA (US); Venkata Duggirala, San Jose, CA (US); Surendra Patel, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,681

(22) Filed: Jan. 28, 2016

Related U.S. Application Data

(63) Continuation of application No. 13/471,217, filed on May 14, 2012, now Pat. No. 9,256,263.

(51) Int. Cl.
*G06F 1/32* (2006.01)

(52) U.S. Cl.
CPC .......... *G06F 1/3287* (2013.01); *G06F 1/3243* (2013.01)

(58) Field of Classification Search
None
See application file for complete search history.

(56) References Cited

U.S. PATENT DOCUMENTS

| 4,729,086 A | * | 3/1988 | Lethellier | H02J 9/061 307/53 |
|---|---|---|---|---|
| 7,203,849 B2 | | 4/2007 | Dove | |
| 2004/0201931 A1 | * | 10/2004 | Korcharz | H02J 1/10 361/18 |
| 2005/0272402 A1 | | 12/2005 | Ferentz et al. | |
| 2006/0053324 A1 | | 3/2006 | Giat et al. | |
| 2008/0244282 A1 | | 10/2008 | Hansalia et al. | |

(Continued)

OTHER PUBLICATIONS

"Energy Efficient Networking" Business White Paper, available at http://h17007.www1.hp.com/docs/mark/4AA3-3866ENW.pdf, accessed May 14, 2012, Hewlett-Packard Development Company, L.P., May 2011, 12 pgs.

(Continued)

*Primary Examiner* — Kim Huynh
*Assistant Examiner* — Joshua Neveln
(74) *Attorney, Agent, or Firm* — Shumaker & Sieffert, P.A.

(57) ABSTRACT

This disclosure describes a more efficient and configurable power allocation scheme for redundant power supply (RPS) systems used in network switches. This allocation scheme allows the system owner to assign power from a shared RPS unit to higher priority devices in any network switch in the system. This permits more granularity in assigning the RPS with backup power available to devices such as ports residing within individual switches in a multiple switch network. An efficient power allocation scheme for RPS allows the user to define the system priority of various devices for backup power according to the user's preferences. The user may assign the RPS to user-defined high priority devices in any piece of equipment. This makes RPS power allocation more flexible by offering the user more setup options for backup power.

19 Claims, 7 Drawing Sheets

(56) References Cited

U.S. PATENT DOCUMENTS

| 2009/0164806 A1 | 6/2009 | Dishman et al. |
| 2011/0145606 A1 | 6/2011 | Diab et al. |
| 2011/0266867 A1 | 11/2011 | Schindler et al. |
| 2011/0320849 A1 | 12/2011 | Cochran et al. |

OTHER PUBLICATIONS

U.S. Appl. No. 13/471,217, filed May 14, 2012 "Efficient Power Allocation for Redundant Power Supply With System Priority".
Prosecution History of U.S. Appl. No. 13/471,217 dated Feb. 6, 2014 to Dec. 18, 2015, 144 pgs.

\* cited by examiner

| SWITCH | PORT | ON/OFF | PRIORITY | POWER |
|---|---|---|---|---|
| SW 12A | PORT 1 | H (ON) | #25 | 34W |
| | PORT 2 | H (ON) | #26 | 34W |
| | PORT 3 | H (ON) | #102 | 34W |
| | PORT 4 | H (ON) | #103 | 34W |
| | SW42A BASE | H (ON) | #24 | 200W |
| | BACKUP | H (YES) | | |
| SW12B | PORT 5 | L (OFF) | #202 | 34W |
| | PORT 6 | L (OFF) | #203 | 34W |
| | PORT 7 | L (OFF) | #204 | 34W |
| | PORT 8 | L (OFF) | #122 | 34W |
| | SW42B BASE | L (OFF) | #121 | 150W |
| | BACKUP | L (NO) | | |
| ... | | | | |
| SW12D | PORT M – 3 | H (ON) | #52 | 15W |
| | PORT M – 2 | H (ON) | #53 | 15W |
| | PORT M – 1 | H (ON) | #104 | 15W |
| | PORT M | H (ON) | #105 | 15W |
| | SW42D BASE | H (ON) | #51 | 200W |
| | BACKUP | H (YES) | | |

EFFICIENT POWER ALLOCATION FOR REDUNDANT POWER SUPPLY WITH SYSTEM PRIORITY

This application is a continuation of U.S. patent application Ser. No. 13/471,217, filed May 14, 2012, the entire content of which is incorporated herein by reference.

TECHNICAL FIELD

This disclosure relates to a network switch, and more particularly, to an Ethernet network switch.

BACKGROUND

Network switches are used for data centers and large corporate offices and provide a number of services, such as 1 gigabit Ethernet (GbE), 10 GbE, and optical network links. These applications often require high availability (HA) features such as two or more redundant power supplies (RPSs) for each network switch to provide maximum uptime for the network. RPS units may be mounted internally or externally and can be load-sharing, hot-swappable, and field-replaceable to maintain uninterrupted operation. In the case of multiple network switches mounted together or a reasonable distance apart, the RPS power budget, i.e., the total backup power that the RPS units may sustain, may be pooled and shared over the multiple switches.

The total available RPS power is typically pooled in a central RPS which provides backup power to a group of the switches within a multi-switch network. Usually, there is not enough backup power from the RPS to drive all of the network switches in the event of a power failure of one or more of the power supplies. When needed, backup power is allocated first to the highest priority switches and on down to the lowest priority switches. In this case, power is typically allocated to the switches based on a total power requirement for each of the switches. That is, the total required power for each switch in a multi-switch network is typically used to determine the priority levels in assigning backup power to the network switches in the event of a power failure. The highest power switches and devices are often granted the highest priority for backup power. For example, the different switches within the multi-switch network may have dissimilar power budgets, typically ranging from 200 W for basic network switches up to 1400 W for more complex switches. As a result, the network switches with the lowest power requirements may be prevented from receiving power from the RPS during times of high demand for backup power. There may also be low priority switches with high priority ports, such as critical network equipment, security cameras, or important telephone equipment, that do not receive power in the event of a power failure.

SUMMARY

This disclosure describes a more efficient and configurable power allocation scheme for RPS systems used with network switches and other electronic equipment. This allocation scheme allows power from a shared RPS unit to be allocated based on per-port characteristics of any network switch or other type of electronic equipment receiving power from the shared RPS. The flexible redundant power allocation scheme permits more granularity in assigning the backup power available from the RPS to network switches by taking into account, and dynamically controlling, the individual communication ports residing within the switches in a multiple switch network. Moreover, the techniques allow network administrators flexibility in that they can place high priority ports within any switch without necessarily having to cluster ports of the same priority on the same switch. The techniques may be especially advantageous for network switches having Power over Ethernet (PoE) ports in which the network switches are required to deliver power through the PoE ports to other external equipment.

In one example implementation, the efficient power allocation techniques described herein allow a user, such as a system administrator, to define priorities of the various communication ports within each switch to control allocation of backup power according to the user's preferences. For example, the user may assign user-defined priorities to the various communication ports in any piece of equipment coupled to the RPS. Such priorities may be, for example, based on the type of PoE equipment coupled to the port, the type of traffic traversing the port, or a variety of factors. In the event backup power is needed, a controller within the RPS may dynamically determine an amount of power that must be reclaimed from the group of switches coupled to the shared RPS. The controller may then direct one or more of the managed group of switches having lower priority communication ports to power down the ports so as to satisfy the imminent power requirements of the group. The RPS may then reallocate the available backup power within the group of switches. As such, the RPS power allocation techniques described herein may be more flexible than other techniques that allocate power on a per-switch basis without regard to network port priority.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 is a table illustrating an example technique related to the RPS of FIG. 1 in further detail.

DETAILED DESCRIPTION

Figure 1:
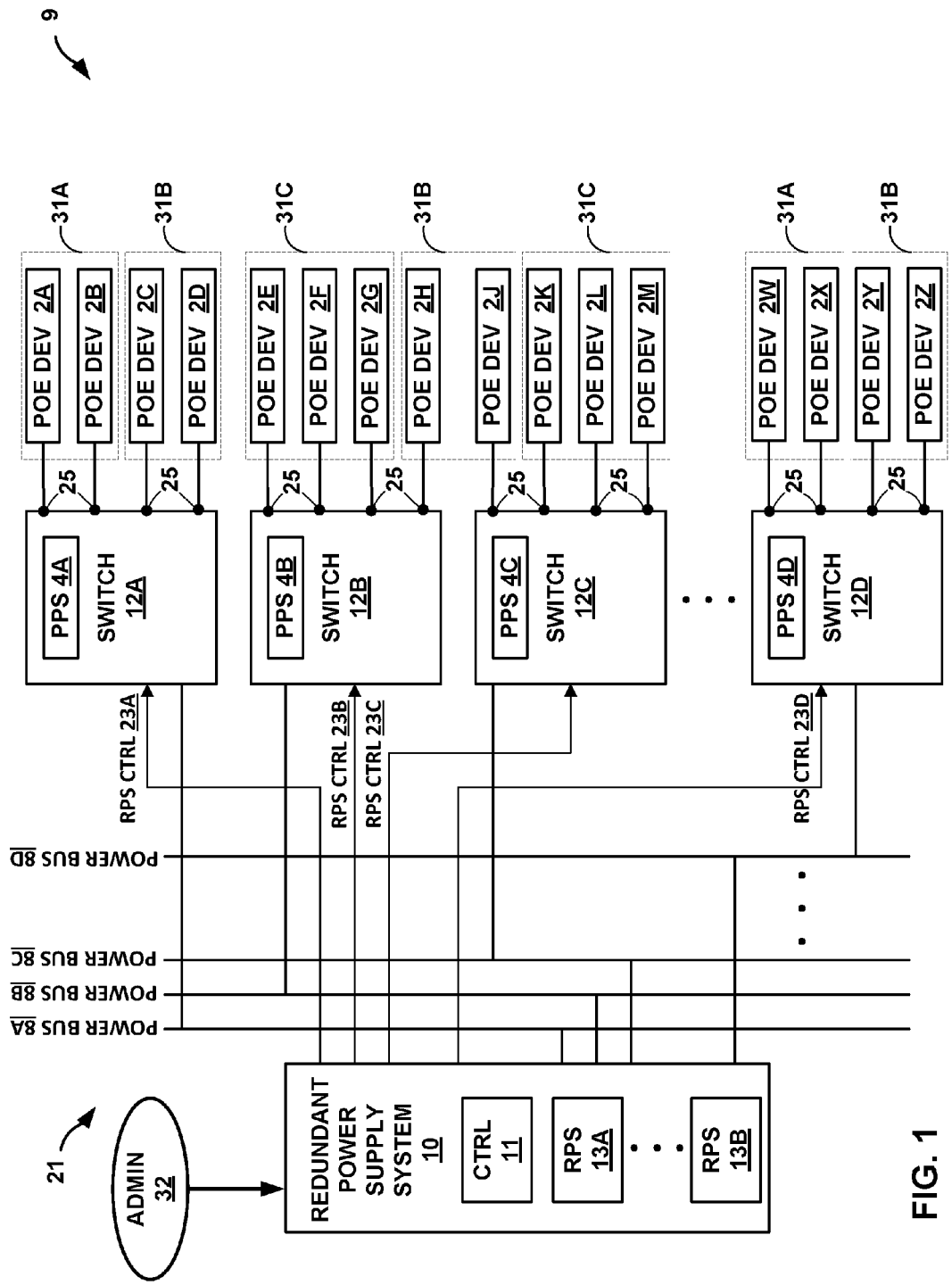
FIG. 1 is a block diagram illustrating a redundant power supply coupled to multiple switches in a network.

FIG. 1 is a block diagram illustrating a redundant power supply (RPS) system 10 coupled to switches 12A-12D in accordance with one or more examples described in this disclosure. RPS system 10 and switches 12 are part of a network of switches and one or more Ethernet devices 2A-2Z which comprise network switch system 9. However, aspects of this disclosure are not limited to network switch systems. For purposes of illustration only and for ease of description, the examples are described in context of network switch system 9. Switches 12 may interface to one or more Ethernet devices 2A-2Z which may be Power over Ethernet (PoE) devices. To maintain high availability (HA), switches 12 may interface to one or more RPS modules 13A-13B in RPS power network 21.

The backup power from RPS system 10 is coupled to switches 12 via power busses 8A-8D. Power busses 8 may be multiple busses at different voltages, independent busses at the same voltage, or any grouping thereof. RPS controller 11 from RPS system 10 is coupled to switches 12 via RPS control 23A-23D signals. RPS control 23 lines may be discrete signal lines, serial bus lines, parallel bus lines, or any other electrical means of connecting control signals from RPS system 10 to switches 12. For example, RPS control 23 lines may be a shared bus such as an I2C serial bus such that the RPS control lines may be coincident upon a single I2C bus coupled to RPS system 10 and all network switches 12. In another example, RPS control 23 lines may be multiple I2C busses with each I2 bus connected from RPS system 10 to a different switch 12. RPS system 10 applies backup power to power busses 8 in the order of priority of the Ethernet devices 2 from the highest priority first and on down to the lowest priority until the total RPS power budget is consumed by the network devices.

RPS system 10 includes controller 11 that computes the available backup power and directs backup power to compensate for failed internal or external primary power supplies (PPS) 4A-4D coupled to the network switches 12. For example, the controller 11 responds to power requests from network switches 12 such that the network switches and ports 25 receive backup power in port-specific priority order according to preprogrammed configuration from the system administrator 32. To initialize network 9, administrator 32 may assign a system priority level, from 1 to 1000 for example, to the base electronics of each network switch 12 and to each one of a plurality of ports 25 within the network switches until the priorities of all devices in the network are specified. After initialization, an efficient power allocation scheme for RPS system 10 may ration backup power to ports 25 and network switches 12 according to system priority.

Controller 11 may allocate RPS system 10 power resources quickly via multiple RPS control busses 23A-23D such as I2C, Ethernet, or SPI which have serial connectivity. Alternatively, switches 12 may collectively negotiate for RPS system 10 power, for example, via a shared single I2C bus 23 used by all of the switches in network 9. For purposes of illustration, the example techniques are described with respect to multiple RPS control busses 23 distributed via I2C to all switches 12 in network 9. However, aspects of this disclosure should not be considered so limiting. The techniques described in this disclosure are extendable to other communications schemes used between microcontrollers, processors, or systems.

Controller 11 of RPS system 10 configures and stores configuration data specifying priorities of backup power for individual Ethernet devices 2 and, thereby, defining priorities for individual ports within switches 12 of network 9. Controller 11 may determine which devices in switch network 9 need backup power based on requests for backup power communicated from switches 12 to RPS system 10 via RPS control busses 23. In response, controller 11 allocates backup power based on priorities defined by administrator 32 for the ports within switches 12 and the total backup power available, thereby prioritizing backup power for higher priority Ethernet devices 2.

To set system priorities for reserve power in switch network 9, administrator 32 may enter information into a master table in controller 11 of RPS system 10 or into an individual table for each switch 12 within network 9. RPS system 10 may determine the total number of ports which are active by consulting the master table or the priority tables within network switches 12. This enables RPS system 10 to calculate the amount of reserve power which may be needed by all switches 12 and ports 25 within switch network 9. Administrator 32 may assign ports 25 with specific priority levels which fall into more general groups of high 31A, medium 31B, and low 31C. Priority groupings 31A-31C may be clustered within individual switches 12 or across multiple switches as shown.

The power requirements of base electronics internal to each of network switches 12 (e.g., internal switch fabric) may be added to the power requirements of ports 25 for the corresponding network switch to determine the overall power needed by the network switch when it requests backup power from the RPS system 10. In some cases, depending upon the amount of backup power needed, controller 11 may direct one or more of switches 12 to deactivated lower priority ports until there is sufficient reserve power available from the RPS system 10 to power higher priority ports or switches which have requested backup power within switch network 9. This allows more granularity in the reserve power budget when RPS system 10 provides backup power to the network 9. Controller 11 may, for example, remove just enough backup power from the lowest priority ports 25 to supply higher priority ports which immediately need reserve power.

Figure 2:
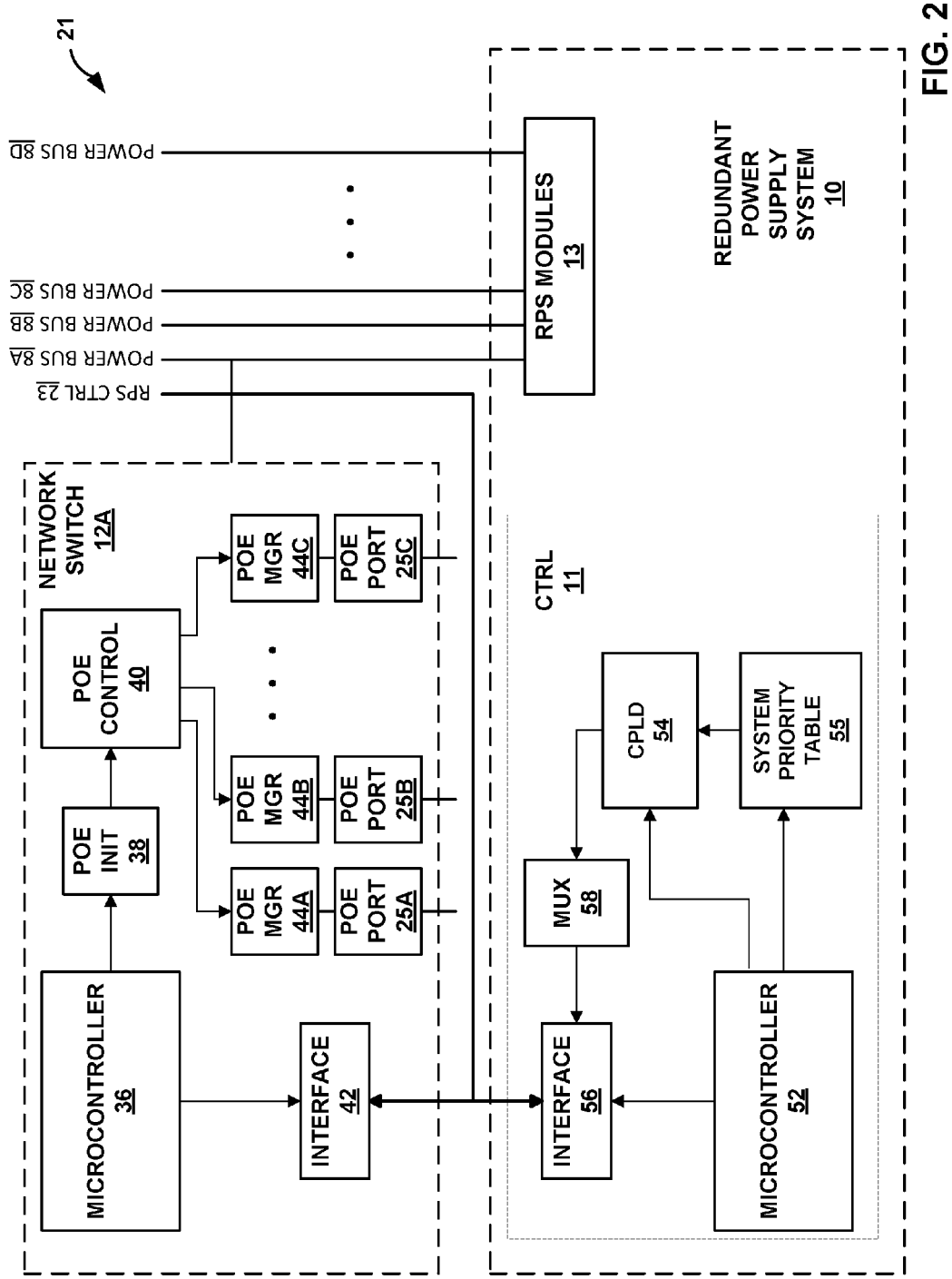
FIG. 2 is a block diagram illustrating examples of backup power components within an RPS and a network switch.

FIG. 2 is a block diagram illustrating an example in which RPS system 10 and RPS modules 13 are coupled to a single switch 12A from a group of switches 12. In this example, controller 11 in RPS system 10 includes microcontroller 52 and complex programmable logic device (CPLD) 54 that access and configure system priority table 55. Multiplexer 58 in controller 11 allows CPLD 54 to select any one of a plurality of RPS control busses 23 connected to interface 56 in order to communicate with any one of a plurality of network switches 12. From FIG. 1, administrator 32 may define the system priorities of ports 25 within switches 12 in the system priority table 55 to resolve requests for backup power from the ports and switches in switch network 9.

In the example of FIG. 2, microcontroller 36 in network switch 12A communicates with RPS system 10 via RPS control busses 23 to determine backup power priority and request backup power from the RPS system when needed. Network switch 12A may contain a number of PoE ports or regular Ethernet ports. For discussion purposes, network switch 12A may contain PoE ports, although the switch may contain a mixture of Ethernet and PoE ports, or all Ethernet ports. In this example, network switch 12A has Ethernet connections at PoE ports 25A-25C. Communications across PoE ports 25 are directed by PoE Manager 44A-44C. Microcontroller 36 may transmit information about the number of PoE ports 25 on network switch 12A and their power budgets to microcontroller 52 on RPS system 10 via RPS control busses 23. This information may include the power budget that network switch 12A may request from RPS system 10 when backup power is needed.

RPS system 10 connects via RPS control busses 23 to as many as ten network switches, typically. RPS control busses 23 allow RPS system 10 and network switches 12 to communicate with each other about various system activities such as allocating the reserve RPS power needed by each switch 12 in network 9. When switch 12A sends a request for backup power to RPS system 10 via RPS control busses 23, microcontroller 52 calculates the reserve power that will be needed to sustain the switch and determines an amount of reserve power that can be reclaimed from other switches based on the priorities of the individual ports. If there is sufficient reserve power in RPS system 10 to supply power to failing switch 12A, the RPS system may decide to supply the full power request of the failing switch within the hold time, i.e. the amount of time dying PPS 4A can sustain the load of the switch, of the dying PPS.

If there is not enough reserve power in RPS system 10 to supply the backup power needed by failing switch 12A, the RPS system may need to reallocate power among ports 25 and network switches 12 according to the system priority of the ports and network switches. RPS system 10 may then use the amount of time left before failing switch 12A loses power to redistribute backup power from lower priority ports 25 and switches 12 to higher priority ports within the failing switch.

Administrator 32 or microcontroller 52 may issue commands to microcontroller 36 in network switch 12A to activate or deactivate one or more of PoE ports 25 in the network switch in the event additional backup power is required. Microcontroller 36 stores a list of these commands in Poe Init 38 which maintains the current status of all PoE ports 25 in network switch 12A. PoE Init 38 passes the status of PoE ports 25 to Poe Control 40 which instructs PoE Managers 44 whether or not to source power from the PoE ports out to PoE network devices 2.

FIG. 3 illustrates an example system priority table 55 from FIG. 2. In this example, system priority table 55 illustrates one technique by which microcontroller 52 in RPS system 10 maintains the power information related to switches 12 in switch network 9. Microcontroller 52 may retrieve the power status from switches 12 to assemble system priority table 55, or administrator 32 may program the power status information about the switches directly into the system priority table. For an individual switch 12A, microcontroller 36 may inform microcontroller 52 of RPS system 10 of any changes in status of PoE ports 25A-25C so that microcontroller 52 may maintain consistency between the information in system priority table 55 and in the individual priority table within the switch.

Administrator 32 may achieve more granularity for backup power requests by assigning a priority level, from 1 to 1000 for example, to each PoE port 25 on network switches 12. Administrator 32 may also designate in system priority table 55 which PoE ports 25 are active (in use) and which are inactive (unused). The decision process by microcontroller 52 to grant reserve power from RPS system 10 may then examine the individual priorities of PoE ports 25 in network switch 12A when it requests backup power from the RPS system.

Administrator 32 may program network switch 12A directly to activate or deactivate PoE ports 25. The power draw of PoE ports 25 will increase the power demand of network switch 12A above the typical 200 W consumed by a network switch 12. For example, a single PoE port 25 may need to source a maximum of 34 W by standard 802.3at and possibly 50 W or more in later PoE standards. Once administrator 32 has activated PoE ports 25 in network switch 12A, microcontroller 36 may inform microcontroller 52 in RPS system 10 of any updates in the power requirements of the network switch including all of its active PoE ports. Microcontroller 52 in RPS system 10 maintains the status of the power needs of all of network switches 12 including the power needed per PoE port 25 as shown in system priority table 55 where some of the PoE ports may have higher power needs (34 W) than other PoE ports (15 W).

Upon a request from switch 12A for backup power, RPS system 10 may determine which devices to turn off in network switches 12 based on system priority table 55 or on individual priority tables within the network switches. RPS system 10 may then, via RPC control busses 23, instruct lower priority devices to power down in order to achieve the target power needed to turn on the higher priority devices which are requesting backup power. RPS system 10 first communicates the power down message to the lower priority devices, then confirms the devices are powered down, and finally instructs the higher priority devices that they will receive backup power. RPS system 10 may then supply reserve power to power busses 8 for the failing devices in switch 12A before the time, i.e. the hold time, at which the failing devices will lose primary power from PPS 4A.

In another example where RPS control busses 23 are a shared single I2C bus among all switches 12 in network 9, the individual switches may communicate directly with each other via the RPS control bus. Microcontroller 52 within RPS system 10 typically determines reserve power assignments for switches 12 within network 9 according to the port priority levels stored in system priority table 55 or in the individual priority tables in the switches. Individual network switches 12 may, however, communicate directly with each other about their reserve power assignments according to the individual priority tables stored within the network switches. This method for determining reserve power assignments from RPS system 10 will typically operate slower than the method utilizing multiple I2C busses connected directly from switches 12 to the RPS system.

Figure 4A:
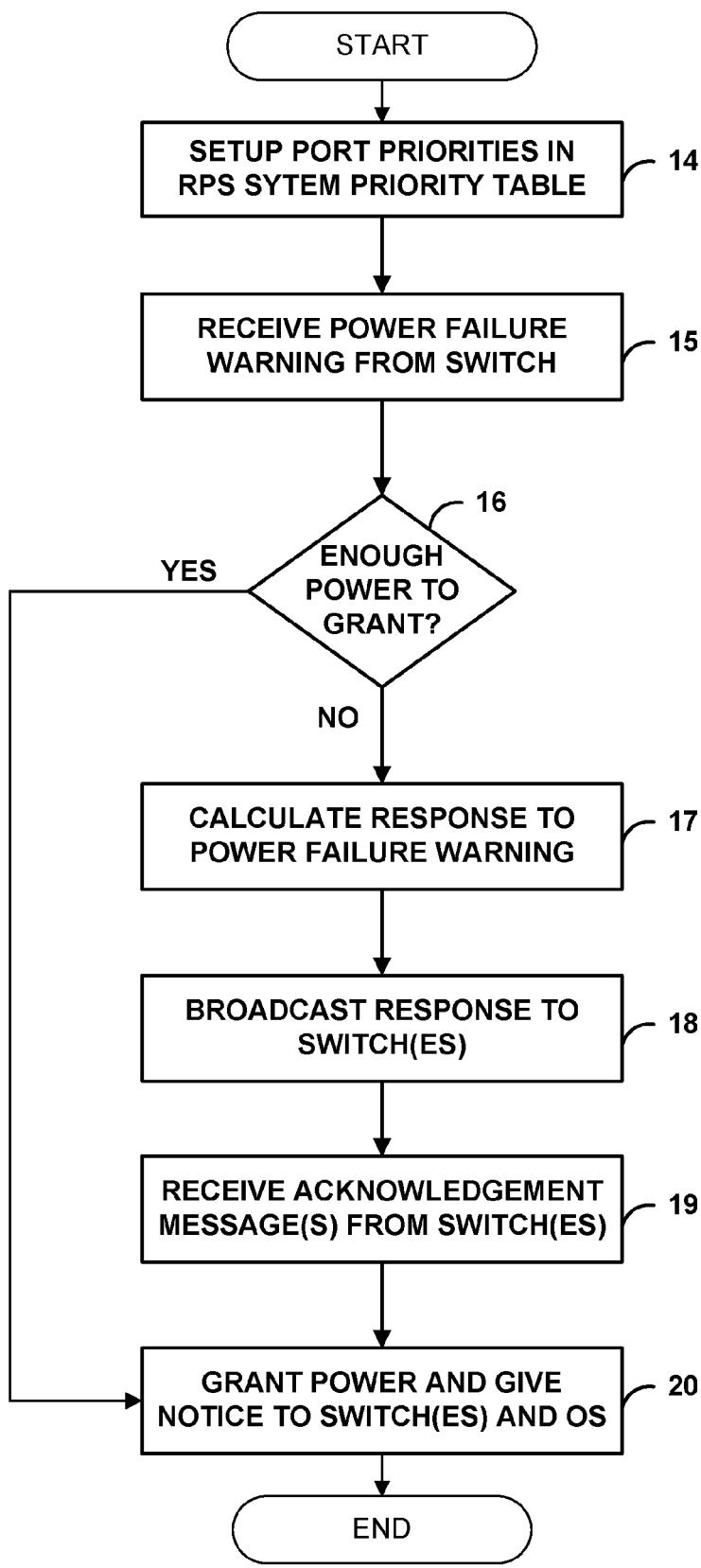
FIGS. 4A and 4B are flowcharts illustrating an example technique in accordance with one or more aspects of this disclosure.
Figure 4B:
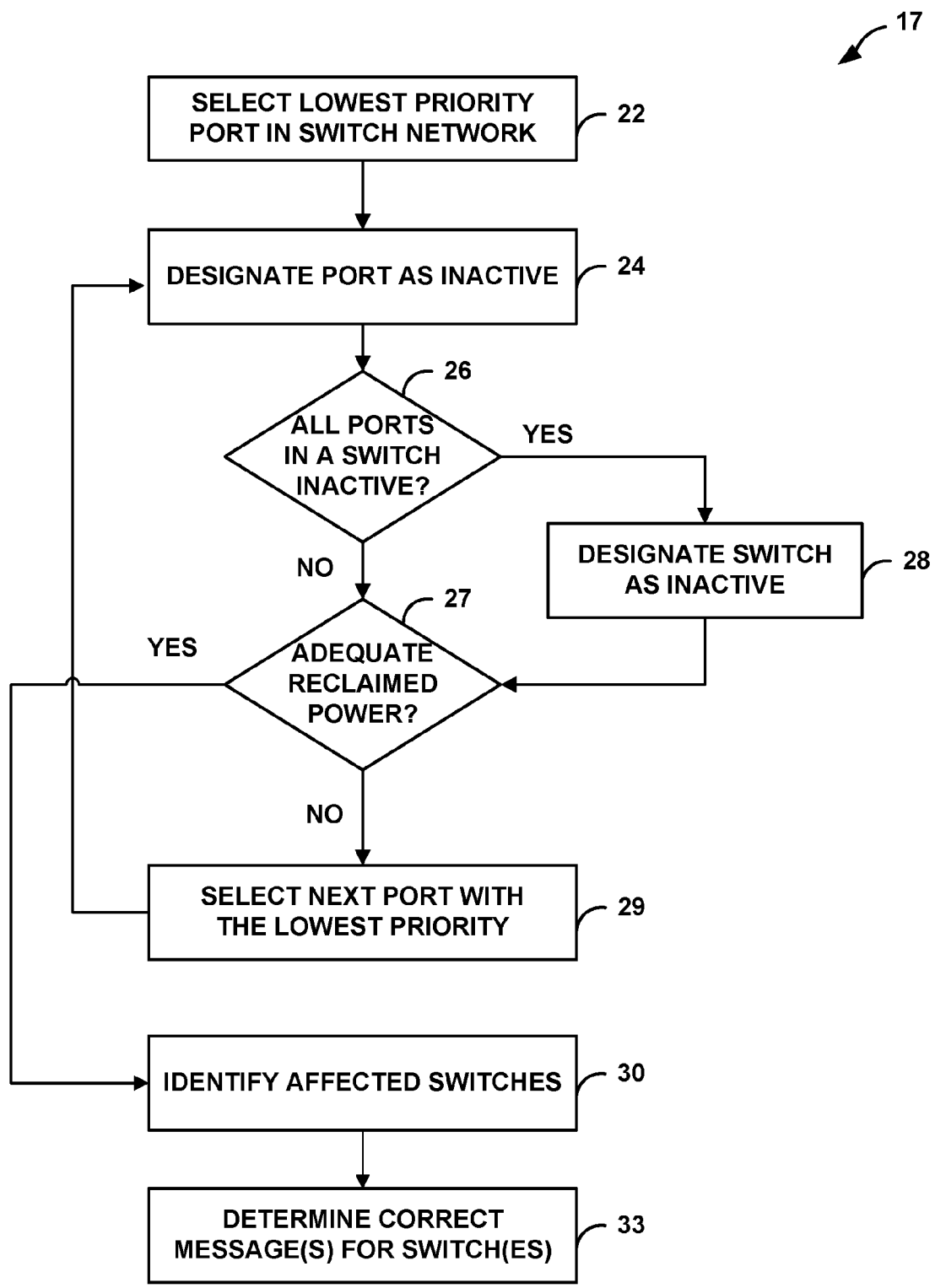

FIGS. 4A and 4B are flowcharts illustrating an example method for efficient power allocation with system priority for RPS system 10 of FIG. 1 and FIG. 2. Initially (14), administrator 32 may set up the system power configuration in system priority table 55 shown in FIG. 3 for RPS system 10. This may include providing configuration data that specifies a power requirement and priority for each port of switches 12 by reviewing the power draw and priority of PoE devices coupled to the ports. RPS system 10 may receive the configuration data directly from administrator 32 or may collect the information from switches 12 using a messaging scheme communicated over RPS control bus 23. In either case, microcontroller 52 of RPS system 10 may add the power draw requirements for PoE ports 25 in each network switch 12 to the power draw of the remaining base electronics of the network switch (e.g., internal switch fabric) to determine a total power draw of the network switch. The power budget of each network switch 12 is stored by microcontroller 52 of RPS system 10 in, for example, system priority table 55. Microcontroller 52 uses the stored power budgets for all network switches 12 in system priority table 55 to calculate the available RPS power when it receives a request for backup power from one or more of the network switches.

When an internal power failure in network switch 12A is about to occur, the network switch outputs a backup power request (e.g., a power failure warning) to microcontroller 52 via RPS control busses 23 (15). The power request from network switch 12A indicates that power is failing within the switch and backup power is needed before a hold time expires. Next, microcontroller 52 in RPS system 10 determines whether enough reserve power exists to grant the request (16). For example, microcontroller 52 in RPS system 10 may compute or otherwise determine the total amount of RPS power currently being drawn by network switches 12, e.g., based on an internal power meter or based on stored values for switch power in system priority table 55. Microcontroller 52 may then subtract the total switch power load on RPS system 10 from the maximum backup power that the RPS system is capable of delivering to determine the total remaining backup power available from the RPS system. If enough reserve power is available (16) to meet the power request from switch 12A and its ports 25, then microcontroller 52 may grant the switch and its ports the full amount of power requested (20). Both switch 12A and a network switch operating system may be notified of a reserve power grant (20). If there is less reserve power available than the power request, microcontroller 52 may calculate a response to the power failure warning (17) from network switch 12A. Response calculation (17) is further illustrated in FIG. 4B.

Referring to FIG. 4B, microcontroller 52 efficiently allocates, possibly including redistributing, reserve power to the network of switches 12 based in individual port priorities. Initially, microcontroller 52 selects the lowest priority port in switch network 9 from system priority table 55 (22). Next, microcontroller 52 may designate the lowest priority port as inactive in system priority table 55 to start the process of reclaiming power from the network of switches 12 (24). Microcontroller 52 then determines whether the deactivation of the port leads to the situation where all ports on a given switch are inactive (26) If the remaining ports within switch 12A are also inactive (26), then microcontroller 52 may designate the entire switch as inactive in system priority table 55 (28), thereby reclaiming additional reserve power. In block (27) following both block (26) and block (28), microcontroller 52 then calculates whether an adequate amount of reserve power is now available to satisfy the power failure request after designating an individual port as inactive (24) and possibly after designating base electronics of a switch as inactive (28). If the available reserve power remains below the amount needed in a power failure request, microcontroller 52 continues reclaiming reserve power by identifying the lowest priority port in the system table still designated as active (29) and repeating the process to designate the port as inactive in system priority table 55 (24).

Once an adequate amount of reserve power has been reclaimed (27), microcontroller 52 then identifies which switches 12 are affected by the power reclamation process, i.e., those switches having one or more ports that are to be deactivated (30). In the following step, microcontroller 52 constructs the correct output message(s) to notify the switch(es) affected by reserve power reclamation (33). As explained herein the messages may be constructed in several forms. For example, the messages may be constructed with identifiers for the specific ports that that each switch 12 is to deactivate. Alternatively, the messages may be constructed to specify an amount of power that each of the switches is to specifically reclaim, which microcontroller 52 computes upon determining the specific ports to be deactivated on each of the switches.

The messages may then be formulated into a response for the network of switches 12. For example, referring again to FIG. 4A, after a calculation of a response to a power failure warning (17), microcontroller 52 may broadcast a response to the affected switch(es) (18). Microcontroller 52 may then receive acknowledgement message(s) from the affected switch(es) (19) indicating that the switch(es) received the broadcast message(s) (18). Upon receiving the acknowledgements that the network of switches 12 have deactivated the designated ports (19), microcontroller 52 then grants (i.e., outputs) reserve power from RPS system 10 to switches 12 in accordance with the newly updated system table 55 (20). In this way, reserve power is optimally and efficiently redistributed to switches 12 in response to a power failure request in a manner that best serves the priorities of the individual PoE devices served by the switch network.

Figure 5:
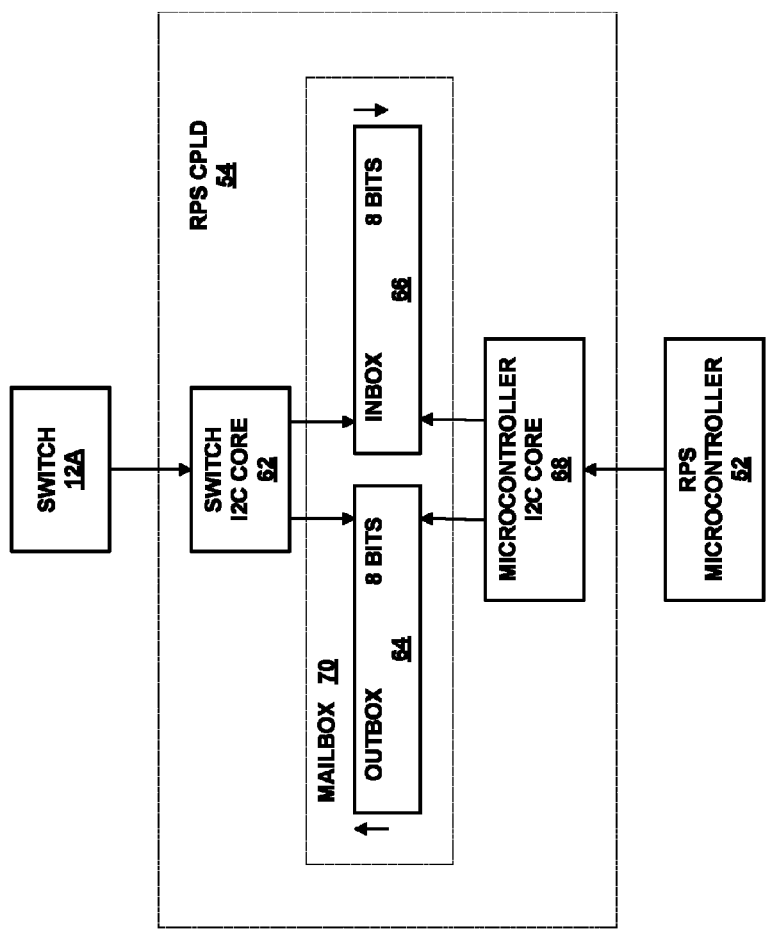
FIG. 5 is a block diagram illustrating examples of components within an RPS CPLD for communicating over I2C bus.

FIG. 5 is a block diagram illustrating example components within CPLD 54 of RPS system 10 for communicating with a switch (e.g., switch 12A) over RPS control bus 23, such as an I2C bus. In one example, switch 12A takes up the role of an I2C master and RPS system 10 acts as an I2C slave. Switch 12A communicates with microcontroller 52 in RPS system 10 using mailbox 70 with outbox 64 and inbox 66 provided by CPLD 54 of the RPS system as read/write registers. In this example, RPS system 10 has one dedicated mailbox for each switch 12 in network 9 connected via RPS control busses 23. Microcontroller 52 manages the input/output direction definition and usage of mailbox 70. There are two mailbox registers in CPLD 54, e.g., one 8 bit register for outbox 64 and one 8 bit register for Inbox 66, for each switch 12 in network 9.

Inbox 66 stores messages from switch 12A to microcontroller 52 in RPS system 10. Outbox 64 stores messages from microcontroller 52 to switch 12A. Each switch 12 in network 9 can write to their respective 8 bit inbox 66 and 8 bit outbox 64 for a total of sixteen bits. Microcontroller 52 in RPS system 10 has access to all mailboxes 70 for switches 12. Table 1 below shows one example format of inbox 66 and outbox 64 registers.

TABLE 1

| Register | Bit-7 (MSB) | Bit-6 | Bit-5 | Bit-4 | Bit-3 | Bit-2 | Bit-1 | Bit-0 (LSB) |
| --- | --- | --- | --- | --- | --- | --- | --- | --- |
| Inbox | BRQ | CTYP | Rsvd | Rsvd | Rsvd | Rsvd | Rsvd | Rsvd |
| Outbox | BGT | BKUP | PS3_FAN_OK | PS2_FAN_OK | PS1_FAN_OK | PS3_OK | PS2_OK | PS1_OK |

Table 2 below illustrates example commands related to the bit settings in Table 1 for inbox 66 and outbox 64.

TABLE 2

INBOX REGISTER

BRQ –> Bus Request
CTYP –> Command type 0: No response required (configuration commands)
CTYP –> Command type 1: Response required (status commands)
OUTBOX REGISTER BGT –> Bus grant
BKUP –> 0: switch is not backed up
BKUP –> 1; switch is backed up
PS3_FAN_OK –> 1: PSU-3 FAN is good, otherwise bad
PS2_FAN_OK –> 1: PSU-2 FAN is good, otherwise bad
PS1_FAN_OK –> 1: PSU-1 FAN is good, otherwise bad
PS3_OK –> 1: PSU-3 is good, otherwise bad
PS2_OK –> 1: PSU-2 is good, otherwise bad
PS1_OK –> 1: PSU-1 is good, otherwise bad Table 3 below shows the read/write access controls of the mailbox registers. An operating system of the switch can only write to inbox registers under special conditions as shown in state table 72 (FIG. 6), controlled by RPS system 10.

TABLE 3

| | Access Permission | |
| --- | --- | --- |
| Mail Box Register | SWITCH O/S | RPS |
| Outbox Register | READ | READ/WRITE |
| Inbox Register | READ/WRITE 72 | READ/WRITE |

Figure 6:
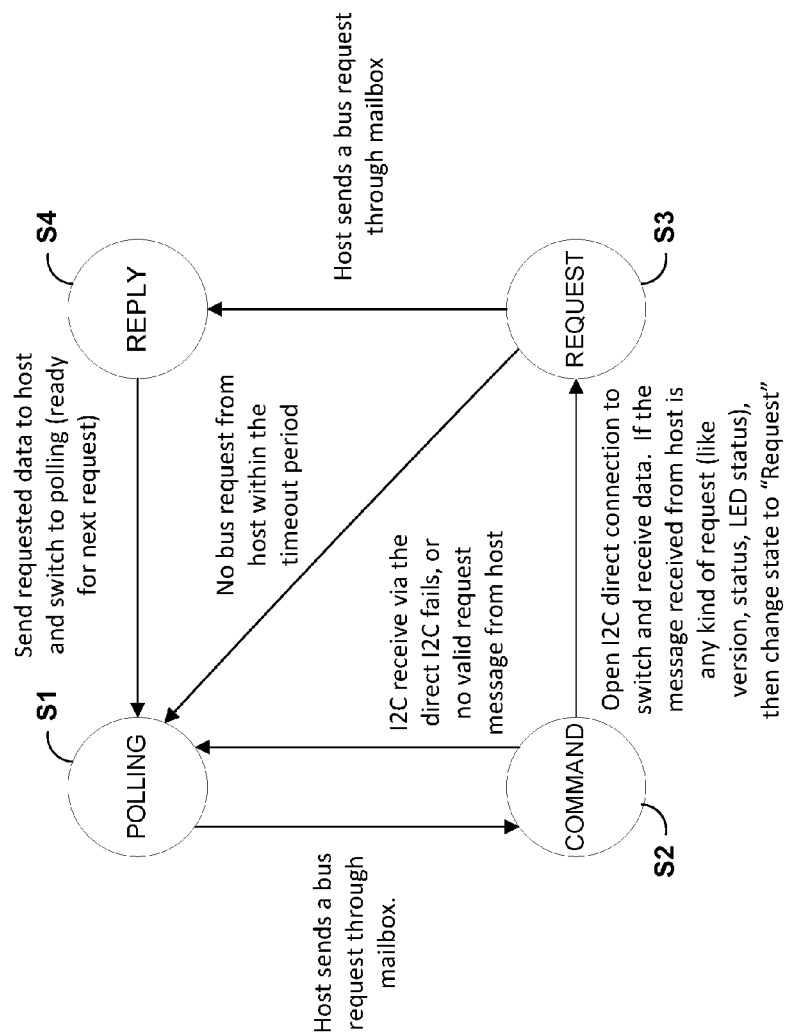
FIG. 6 is a state diagram illustrating an example technique in accordance with one or more aspects of this disclosure.

FIG. 6 is a state diagram 72 illustrating operating states of microcontroller 52 with respect to communications between microcontroller 52 of RPS system 10 and network switches 12. Microcontroller 52 communicates with network switches 12 over RPS control busses 23, which may be I2C busses. Switch 12 may be configured as the master and microcontroller 52 as the slave on each of a plurality of I2C busses. Microcontroller 52 and switches 12 may communicate using Mailboxes 70 from FIG. 5 or I2C direct connect. Mailboxes 70 may be used to perform bus request (from switches 12) and bus grant (from microcontroller 52).

The message handling state machine in FIG. 6 may be implemented in RPS system 10 firmware used by microcontroller 52. The four states Polling S1, Command S2, Request S3, and Reply S4 may be mapped to the four phases of the protocol handshaking. Mailboxes 70, typically up to 10, in RPS CPLD 54 may communicate with switches 12 with each Mailbox having its own state machine running simultaneously and independently.

At Polling S1 state, Inbox 66 may be polled to see the bus request set by network switch 12. If the bus request is set, microcontroller 52 may set bus grant in corresponding Outbox 64 and clear the bus request from Inbox 66. At this moment, RPS system 10 transitions to Command S2 state.

In Command S2 state, microcontroller 52 may elect to wait or directly go to I2C slave transmit mode (corresponding to I2C master transmit for switch 12) to receive commands from the switch. There may be few cases for the receiving command. If I2C slave receive times out, the next state is Polling S1. If a command is successfully received, microcontroller 52 may execute the set command (no reply) and transition to Polling S1 state. The get command may record the command code and echo number, clear bus grant, start timeout counting, and then transition to Request S3 state.

At Request S3 state, microcontroller 52 waits for bus request again. The mechanism is similar to Polling S1 state. If there is a timeout before bus request, the state of microcontroller 52 transitions to Polling S1 state. However, if microcontroller 52 receives bus request, bus grant is set, bus request is cleared, and the state machine transitions to Reply S4 state.

After entering Reply S4 state, microcontroller 52 builds the reply message, the state machine transitions to I2C slave receiving mode (corresponding to switch I2C master receive) and waits to transmit a reply message to switch 12. The wait time may timeout in 100 milleseconds. At the end of transmitting, the state machine transitions to Polling S1 state.

Table 4 below shows an example message construct for messaging between microcontroller 52 and network switch 12. When microcontroller 52 transitions from Command S2 state to Request S3 state, the microcontroller receives a message from the host. When microcontroller 52 transitions from Reply S4 state to Polling S1 state, the microcontroller sends a message to the host as indicated by FIG. 6. The data portion of the message may carry a response to the command in case of reply or in case of request, may carry the command details.

TABLE 4

| Byte | | | | | |
|---|---|---|---|---|---|
| 0 | 1 | 2 | 3 | 4 | 5 |
| Cmd type 1-command | Echo | Dummy-not used | Length of payload | Command (start of | Data |

TABLE 4-continued

| Byte | | | | | |
|---|---|---|---|---|---|
| 0 | 1 | 2 | 3 | 4 | 5 |
| 2-request 3-reply | | | | payload) 1-Get LED status 2-Get PSU status 3-Get RPS status 4-Get RPS version 5-Set RPS priority 6-Disable backup | |

The following tables show the contents of the data portion of the message construct in Table 4 above between microcontroller 52 and network switch 12. Table 5 below details the Switch Sign On message (switch to RPS).

TABLE 5

| Switch Serial Number | Available Power from local PSU | System power (power required to run just the switch) | Total Power needed for full PoE |
|---|---|---|---|

Table 6 below shows the RPS Ack message (RPS to switch. RPS will provide a unique identifier to the switch. From here on, the switch will use this to identify itself).

TABLE 6

| Switch Identifier | RPS can backup you? (Yes/No: 1 = Yes, 2 = No) |
|---|---|

Table 7 below shows the Port Priority message (switch to RPS).

TABLE 7

| Switch Identifier | Port Number | Port Priority |
|---|---|---|

Table 8 below shows the Port Power Allocation message (switch to RPS).

TABLE 8

| Switch Identifier | Port Number | Amount of power allocated (by user or by class) |
|---|---|---|

Table 9 below shows one example of a Power Reduction message which is the Reduce Budget message (RPS to switch).

TABLE 9

| Switch Identifier | New Budget |
|---|---|

Table 10 below shows another example of a Power Reduction message which is the Power Off Specific Ports message (RPS to switch).

TABLE 10

| Switch Identifier | Bitmap of Ports (0 . . . 255 bits) |
|---|---|

The techniques of this disclosure may be implemented in a variety of devices or apparatuses, including routers, switches, or other electronic equipment. Various components, modules or units are described in this disclosure to emphasize functional aspects of devices configured to perform the disclosed techniques, but do not necessarily require realization by different hardware units. Instead, various units may be combined in a hardware unit or provided by a collection of interoperative hardware units.

Various examples have been described. These and other examples are within the scope of the following claims.

The invention claimed is:

1. A method comprising:
receiving, by a redundant power supply, configuration data specifying a priority and a power requirement for each of a plurality of ports within a plurality of network switches, wherein the redundant power supply is connected to the network switches by one or more control busses and one or more reserve power busses, each of the network switches having a respective power supply separate from the redundant power supply;
receiving, by the redundant power supply, via the one or more control busses, a request from one of the network switches for reserve power from the redundant power supply in response to power from the respective power supply for the network switch failing in the network switch;
in response to the request, determining, by the redundant power supply, based on the priorities and power requirements of the ports within the network switches, an amount of reserve power to grant to the network switch requesting the reserve power; and
outputting the amount of reserve power via at least one of the one or more reserve power busses from the redundant power supply to the network switch requesting the reserve power.

2. The method of claim 1, further comprising:
receiving, by the redundant power supply, configuration data specifying a priority and a power requirement for base electronics within each of the plurality of network switches,
wherein determining, by the redundant power supply, the amount of reserve power to grant to the network switch requesting the reserve power comprises determining the amount of reserve power based on the power requirements of the base electronics and the individual ports within the network switch requesting the reserve power.

3. The method of claim 2, further comprising:
receiving, via the one or more control busses, a plurality of requests from the plurality of network switches for concurrent reserve power from the redundant power supply;
determining, by the redundant power supply, an amount of reserve power to grant to the network switch requesting the reserve power based on the priorities and power requirements of a plurality of base electronics and the plurality of ports within the network switches; and
transmitting the amount of reserve power via at least one of the one or more reserve power busses, from the redundant power supply to the network switches requesting reserve power.

4. The method of claim 1, wherein receiving the configuration data comprises receiving, by the redundant power supply, via the one or more control busses, messages specifying the priorities and power requirements for the ports of each of the network switches.

5. The method of claim 1, wherein receiving the configuration data comprises receiving, by the redundant power supply, the configuration data from an administrator.

6. The method of claim 1, further comprising:
transmitting reserve power via a plurality of the reserve power busses, from the redundant power supply to a particular one of the network switches connected to the redundant power supply by the reserve power busses and the one or more control busses.

7. The method of claim 1, wherein the plurality of ports within the plurality of network switches are power-over-Ethernet (PoE) ports.

8. The method of claim 1, wherein the plurality of network switches forms a network switch system.

9. The method of claim 1, further comprising:
storing, by the redundant power supply, a system priority table containing system priority levels, power requirements, reserve power status for the plurality of network switches and the plurality of ports within the network switches.

10. The method of claim 1, further comprising:
maintaining a plurality of mailboxes within the redundant power supply, each respective mailbox of the plurality of mailboxes containing an in box and an outbox for storing data and commands transmitted between the redundant power supply and a respective network switch from the plurality of network switches; and
operating the redundant power supply in accordance with a plurality of state machines each controlling logical states of a respective mailbox from the plurality of mailboxes.

11. The method of claim 1, further comprising:
in response to the request, ranking the ports in accordance with the priorities of the ports and repeatedly designating for deactivation each port in an ascending order of priority until sufficient power has been reclaimed to satisfy the request; and
outputting one or more messages to direct the switches to deactivate the ports designated for deactivation.

12. A redundant power supply comprising:
a power supply unit configured to supply power to one or more reserve power busses; and
a control unit configured to:
receive configuration data specifying a priority and a power requirement for each of a plurality of ports within one or more network switches, wherein the redundant power supply is connected to the one or more switches by one or more control busses and the one or more reserve power busses, each of the network switches having a respective power supply separate from the redundant power supply;
receive, by the one or more control busses, a request from one of the network switches for reserve power from the redundant power supply in response to power from the respective power supply for the network switch failing in the network switch;
determine an amount of reserve power to grant to the network switch requesting the reserve power based on the priorities and power requirements of the ports within the network switch; and
output the amount of reserve power via at least one of the one or more reserve power busses from the redundant power supply to the network switch requesting the reserve power.

13. The redundant power supply of claim 12,
wherein the control unit is configured to receive configuration data specifying a priority and a power requirement for base electronics within each of the plurality of network switches, and wherein the control unit is configured such that, as part of determining the amount of reserve power to grant to the network switch requesting the reserve power, the control unit determines the amount of reserve power based on the power requirements of the base electronics and the individual ports within the network switch requesting the reserve power.

14. The redundant power supply of claim 13,
wherein the control unit is configured to:
receive, via the one or more control busses, a plurality of requests from the plurality of network switches for concurrent reserve power from the redundant power supply; and
determine an amount of reserve power to grant to the network switch requesting the reserve power based on the priorities and power requirements of a plurality of base electronics and the plurality of ports within the network switches, and
the power supply unit is configured to transmit the amount of reserve power via at least one of the one or more reserve power busses, from the redundant power supply to the network switches requesting reserve power.

15. The redundant power supply of claim 12, wherein the one or more processors are configured to receive, via the one or more control busses, messages specifying the priorities and power requirements for the ports of each of the network switches.

16. The redundant power supply of claim 12, wherein the plurality of ports within the plurality of network switches are power-over-Ethernet (PoE) ports.

17. The redundant power supply of claim 12, wherein the plurality of network switches forms a network switch system.

18. The redundant power supply of claim 12, wherein the control unit is configured to store a system priority table containing system priority levels, power requirements, reserve power status for the plurality of network switches and the plurality of ports within the network switches.

19. The redundant power supply of claim 12,
wherein the control unit responds to the request by ranking the ports in accordance with the priorities of the ports and repeatedly designating for deactivation each port in an ascending order of priority until sufficient power has been reclaimed to satisfy the request, wherein the control unit outputs one or more messages to direct the switches to deactivate the ports designated for deactivation.

* * * * *